United States Patent
Walsh (10) Patent No.: US 10,449,454 B2
(45) Date of Patent: Oct. 22, 2019

(54) SYSTEM AND METHOD FOR DETERMINING EVENTS OF INTEREST IN A MULTI-PLAYER ONLINE GAME

(71) Applicant: MZ IP Holdings, LLC, Palo Alto, CA (US)

(72) Inventor: Matt Walsh, San Carlos, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 0 days.

(21) Appl. No.: 15/878,894

(22) Filed: Jan. 24, 2018

(65) Prior Publication Data

US 2018/0214772 A1 Aug. 2, 2018

Related U.S. Application Data

(60) Provisional application No. 62/451,238, filed on Jan. 27, 2017.

(51) Int. Cl.
| | |
|---|---|
| *A63F 13/5255* | (2014.01) |
| *H04N 21/2187* | (2011.01) |
| *A63F 13/67* | (2014.01) |
| *A63F 13/85* | (2014.01) |
| *A63F 13/79* | (2014.01) |

(Continued)

(52) U.S. Cl.
CPC .......... *A63F 13/5255* (2014.09); *A63F 13/46* (2014.09); *A63F 13/67* (2014.09); *A63F 13/79* (2014.09); *A63F 13/795* (2014.09); *A63F 13/85* (2014.09); *H04N 21/2187* (2013.01)

(58) Field of Classification Search
CPC ...................................................... G07F 17/34
See application file for complete search history.

(56) References Cited

U.S. PATENT DOCUMENTS

2011/0212756 A1* 9/2011 Packard ............... H04N 21/251
463/1
2015/0224395 A1 8/2015 Trombetta et al.
(Continued)

FOREIGN PATENT DOCUMENTS

WO WO-2016/210070 A1 12/2016

OTHER PUBLICATIONS

Int'l Search Report and Written Opinion of the ISA/EP in PCT/US2018/015073; dated Apr. 6, 2018; 12 pgs.
(Continued)

*Primary Examiner* — Robert T Clarke, Jr.
(74) *Attorney, Agent, or Firm* — Goodwin Procter LLP (57) ABSTRACT

Implementations of the present disclosure are directed to a method, a system, and an article for identifying events of interest in a multi-player online game and enabling users to witness the events of interest. An example computer-implemented method can include: obtaining a set of parameters for each of a plurality of events in an online game played by a plurality of users; calculating a score for each event based on the set of parameters, the score providing an indication of a user interest in witnessing the event; identifying one or more events as having a highest user interest, based on the scores; notifying at least one user from the plurality of users about the identified one or more events; receiving an indication that the at least one user has selected one of the identified one or more events; and enabling the at least one user to witness the selected event.

14 Claims, 5 Drawing Sheets

(51) Int. Cl.
*A63F 13/46* (2014.01)
*A63F 13/795* (2014.01)

(56) References Cited

U.S. PATENT DOCUMENTS

| | | | |
|---|---|---|---|
| 2016/0279511 A1* | 9/2016 | Miller | A63F 13/26 |
| 2016/0310843 A1* | 10/2016 | Webb | A63F 13/497 |
| 2017/0006322 A1* | 1/2017 | Dury | H04N 21/254 |
| 2017/0106283 A1* | 4/2017 | Malyuk | A63F 13/49 |
| 2018/0020243 A1* | 1/2018 | Ni | H04N 21/2187 |
| 2018/0161675 A1* | 6/2018 | Miron | A63F 13/497 |

OTHER PUBLICATIONS

"Blizzard applied for a patent on *Overwatch's* Play of the Game highlight system," accessed on the internet at https://gamasutra.com/view/news/320803/Blizzard_applied_for_a_patent_on_Overwatchs_Play_of_the_Game_highlight_system.php; Jun. 28, 2018; 2pgs.

\* cited by examiner

SYSTEM AND METHOD FOR DETERMINING EVENTS OF INTEREST IN A MULTI-PLAYER ONLINE GAME

CROSS-REFERENCE TO RELATED APPLICATIONS

This application claims the benefit of U.S. Provisional Patent Application No. 62/451,238, filed Jan. 27, 2017, the entire contents of which are incorporated by reference herein.

BACKGROUND

The present disclosure relates to online games and, in certain examples, to systems and methods for determining events of interest in multi-player online games.

In general, a multi-player online game can be played by hundreds of thousands or even millions of players who use client devices to interact with a virtual environment for the online game. The players are typically working to accomplish tasks, acquire assets, or achieve a certain score or level in the online game. Some games require or encourage players to form groups or teams that can play against other players or groups of players.

Events that occur in multi-player online games are typically witnessed or seen only by users who participate in the events. As a result, interesting events involving, for example, disputes between high-level players or difficult or unique problems, can go unnoticed by the vast majority of users, who generally have no way to search for or to witness such events.

SUMMARY

In general, the systems and methods described herein relate to an approach for enabling users to witness events of interest in a multi-player online game. The events of interest can be determined by collecting parameters for a plurality of game events. The parameters can be provided as input to a predictive model (e.g., a regression equation and/or a trained classifier) that calculates a score for each event. Based on the scores, the systems and methods can identify events that users or players of the online game may be interested in witnessing. A user can select one of the identified events and be allowed to witness the identified event, as a spectator. Advantageously, the approach allows interesting events in the online game to be witnessed and enjoyed by any user, in addition to the users who are participating in the event. The approach improves user satisfaction and engagement with the online game.

Further, the predictive model used to identify the events of interest can be continuously or periodically updated according to feedback obtained from users, either directly or indirectly. Advantageously, as the model improves, interesting events can be identified more accurately and/or efficiently, thereby enabling users to witness events of greatest interest in the online game.

In one aspect, the subject matter described in this specification relates to a method. The method includes: obtaining a set of parameters for each of a plurality of events in an online game played by a plurality of users; calculating, by one or more computer processors, a score for each event based on the set of parameters, the score providing an indication of a user interest in witnessing the event; identifying, by the one or more computer processors, one or more events as having a highest user interest, based on the scores; notifying, by the one or more computer processors, at least one user from the plurality of users about the identified one or more events; receiving an indication that the at least one user has selected one of the identified one or more events; and enabling, by the one or more computer processors, the at least one user to witness the selected event.

In certain implementations, the parameters can include a user level in the online game, a user condition in the online game, a user connection status to the online game, a user history with another user in the online game, a location in a virtual environment for the online game, and any combination thereof. The plurality of events can include a competition, an attack, a battle, a use of virtual assets, a movement of virtual assets, and any combination thereof. Obtaining the set of parameters can include performing a periodic scan of a virtual environment for the online game. Calculating the score for each event can include using a predictive model that receives the set of parameters as input and provides the score as output. The predictive model can be or include, for example, a regression equation and/or a trained classifier.

In some examples, the method can include: determining an actual level of user interest in witnessing the identified one or more events; and refining the predictive model based on the actual level of user interest. Additionally or alternatively, the method can include: identifying one or more users from the plurality of users who participated in the selected event; and notifying the identified one or more users about a level of user interest in witnessing the selected event. Enabling the at least one user to witness the selected event can include presenting on a client device a live version of the selected event and/or a recording of the selected event. Additionally or alternatively, enabling the at least one user to witness the selected event can include preventing the user from participating in the selected event.

In another aspect, the subject matter described in this specification relates to a system. The system includes one or more computer processors programmed to perform operations including: obtaining a set of parameters for each of a plurality of events in an online game played by a plurality of users; calculating a score for each event based on the set of parameters, the score providing an indication of a user interest in witnessing the event; identifying one or more events as having a highest user interest, based on the scores; notifying at least one user from the plurality of users about the identified one or more events; receiving an indication that the at least one user has selected one of the identified one or more events; and enabling the at least one user to witness the selected event.

In certain examples, the parameters can include a user level in the online game, a user condition in the online game, a user connection status to the online game, a user history with another user in the online game, a location in a virtual environment for the online game, and any combination thereof. The plurality of events can include a competition, an attack, a battle, a use of virtual assets, a movement of virtual assets, and any combination thereof. Obtaining the set of parameters can include performing a periodic scan of a virtual environment for the online game. Calculating the score for each event can include using a predictive model that receives the set of parameters as input and provides the score as output. The predictive model can be or include, for example, a regression equation and/or a trained classifier.

In some instances, the operations can include: determining an actual level of user interest in witnessing the identified one or more events; and refining the predictive model based on the actual level of user interest. Additionally or alternatively, the operations can include: identifying one or more users from the plurality of users who participated in the selected event; and notifying the identified one or more users about a level of user interest in witnessing the selected event. Enabling the at least one user to witness the selected event can include presenting on a client device a live version of the selected event and/or a recording of the selected event. Additionally or alternatively, enabling the at least one user to witness the selected event can include preventing the user from participating in the selected event.

In another aspect, the subject matter described in this specification relates to an article. The article includes a non-transitory computer-readable medium having instructions stored thereon that, when executed by one or more computer processors, cause the computer processors to perform operations including: obtaining a set of parameters for each of a plurality of events in an online game played by a plurality of users; calculating a score for each event based on the set of parameters, the score providing an indication of a user interest in witnessing the event; identifying one or more events as having a highest user interest, based on the scores; notifying at least one user from the plurality of users about the identified one or more events; receiving an indication that the at least one user has selected one of the identified one or more events; and enabling the at least one user to witness the selected event.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

In various implementations, the subject matter of this disclosure relates to (i) determining events that users (also referred to herein as "players") of a multi-player online game may be interested in witnessing and (ii) enabling the users to witness such events (also referred to herein as "hotspots" or "points of interest"). While users can sometimes encounter hotspots on their own (e.g., by exploring a virtual environment for an online game) or with assistance from other users (e.g., by communicating with other users), the systems and methods described herein can scan or monitor an entire online game and identify events of potentially greatest interest. A list of such events can be presented to users, and the users can select one of the events to become a witness or spectator for the event.

Figure 1:
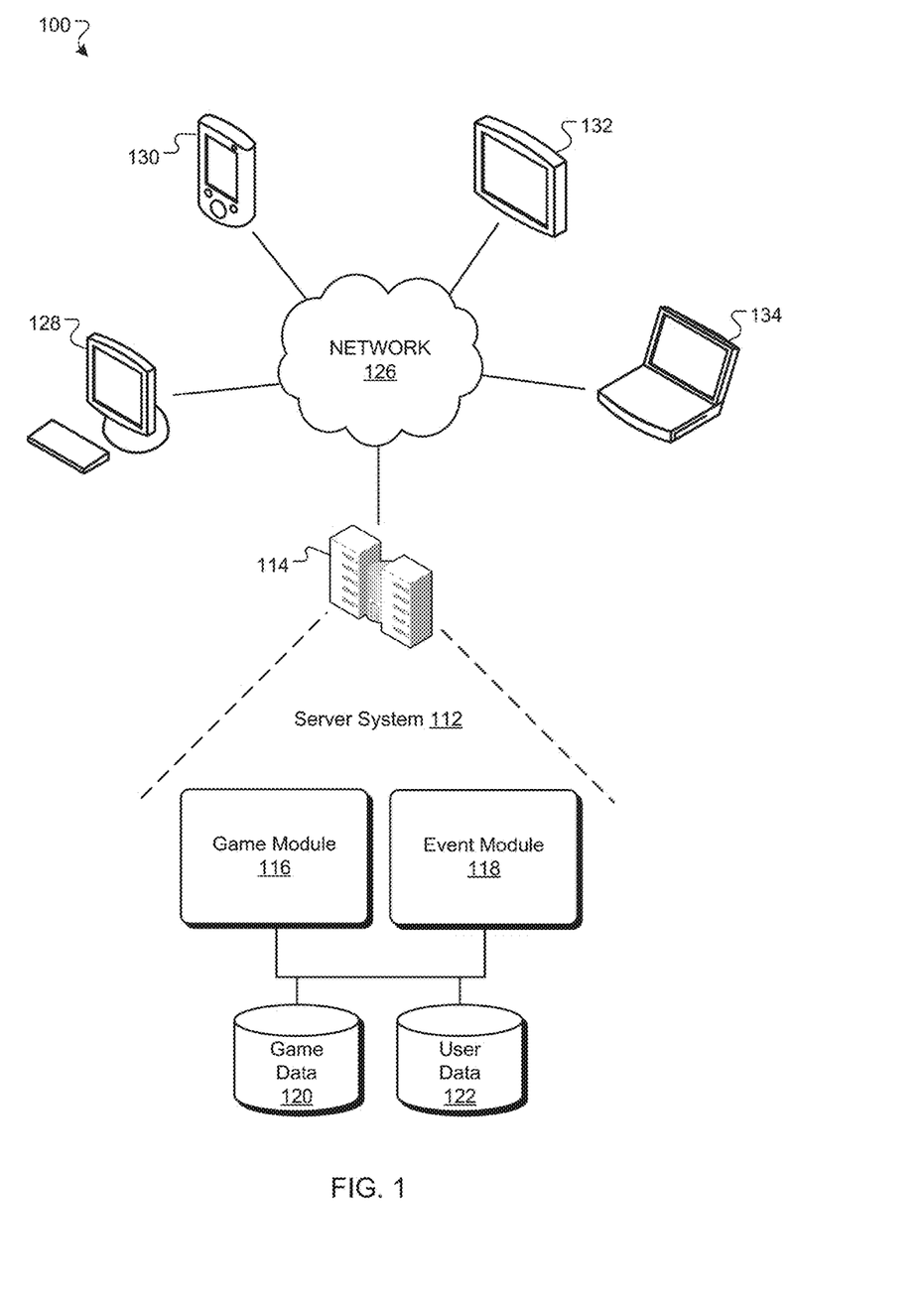
FIG. 1 is a schematic diagram of an example system for identifying events of interest in an online game and enabling users to witness the events of interest.

FIG. 1 illustrates an example system 100 for enabling users to witness events of interest in an online game such as, for example, a massively multi-player online game or the like. A server system 112 provides functionality for providing the online game to a plurality of users and for enabling users to witness events of interest in the online game. The server system 112 includes software components and databases that can be deployed at one or more data centers 114 in one or more geographic locations, for example. The server system 112 software components can include a game module 116 and an event module 118. The software components can include subcomponents that can execute on the same or on different individual data processing apparatus. The server system 112 databases can include game data 120 and user data 122 databases. The databases can reside in one or more physical storage systems. The software components and data will be further described below.

An application, such as, for example, a web-based application, can be provided as an end-user application to allow users to interact with the server system 112. The end-user application can be accessed through a network 126 (e.g., the Internet) by users of client devices, such as a personal computer 128, a smart phone 130, a tablet computer 132, and a laptop computer 134. Other client devices are possible. In alternative examples, the game data 120 and/or the user data 122 or any portions thereof can be stored on one or more client devices. Additionally or alternatively, software components for the system 100 (e.g., the game module 116 and/or the event module 118) or any portions thereof can reside on or be used to perform operations on one or more client devices.

FIG. 1 depicts the game module 116 and the event module 118 as being able to communicate with the databases (e.g., the game data 120 and the user data 122 databases). The game data 120 database generally includes information related to the multi-player online game implemented using the system 100. The game data 120 database can include, for example, information related to a virtual environment for the game, image, video and/or audio data for the game, event data corresponding to previous, current or future game events, and/or game state data defining a current state of the game. The user data 122 database generally includes data related to users and user interactions with the online game and/or the virtual environment. Such information can be or include, for example, a history of user connections to the system 100, user purchases, user accomplishments, user levels, user tasks, user interactions with other users (e.g., group chats), user virtual item acquisition or usage, and/or other user conditions in the virtual environment and/or real world. The user data 122 database can include information related to game events that users may be interested in witnessing. Such information can include, for example, an indication of preferred types of game events or characteristics of game events.

In various examples, the users or players of the online game can have certain user capabilities in the virtual environment. The user capabilities can be or include, for example, moving an avatar or a virtual item or object to a different geographical location, interacting with characters or other users, participating in user groups or alliances, attacking other users, deploying troops, defending against an attack from other users, deploying defenses, building or modifying a virtual item or object (e.g., a virtual building or other structure), developing a new skill, operating a vehicle, acquiring a virtual item (e.g., a weapon), using or interacting with a virtual item (e.g., a playing card or a weapon), and performing supernatural tasks (e.g., casting a spell). Other user capabilities are possible.

The virtual environment for the online game can be rendered for users in the form of, for example, graphics, images, video, audio, text, and/or haptic feedback. In an adventure game, for example, a graphical user interface can display a virtual environment that includes representations of characters (e.g., people or animals), natural features (e.g., mountains, rivers, fields, trees, and/or weather conditions), and/or man-made features (e.g., buildings, bridges, and/or vehicles).

In some examples, users can earn points or other assets in the online game by performing tasks or reaching certain goals, including, for example: winning a match or group of matches against a computer or other user; eliminating a quantity of another user's resources (e.g., one point per eliminated enemy troop); discovering a quantity of a virtual resource (e.g., one point per hidden gold coin discovered in a virtual environment); participating in a mini-game that can support the online game (e.g., one point per spin of a virtual slot machine); crafting or building a virtual item (e.g., one point for building a virtual weapon); increasing user level or user power (e.g., one point per unit increase in user power); and/or using a new game feature (e.g., one point for using a newly released virtual item). Other ways of earning points in the online game are possible. In various examples, rewards earned in an online game can be or include, for example, virtual goods, virtual resources, new user titles (e.g., "Tournament Champion" or "Prince of the Realm"), new graphical elements (e.g., a glow, color change, or decorations at a user location or for user items), special limited or early release items (e.g., permit user to be a first user of a new game feature or item), and/or cryptocurrency payouts.

Figure 2:
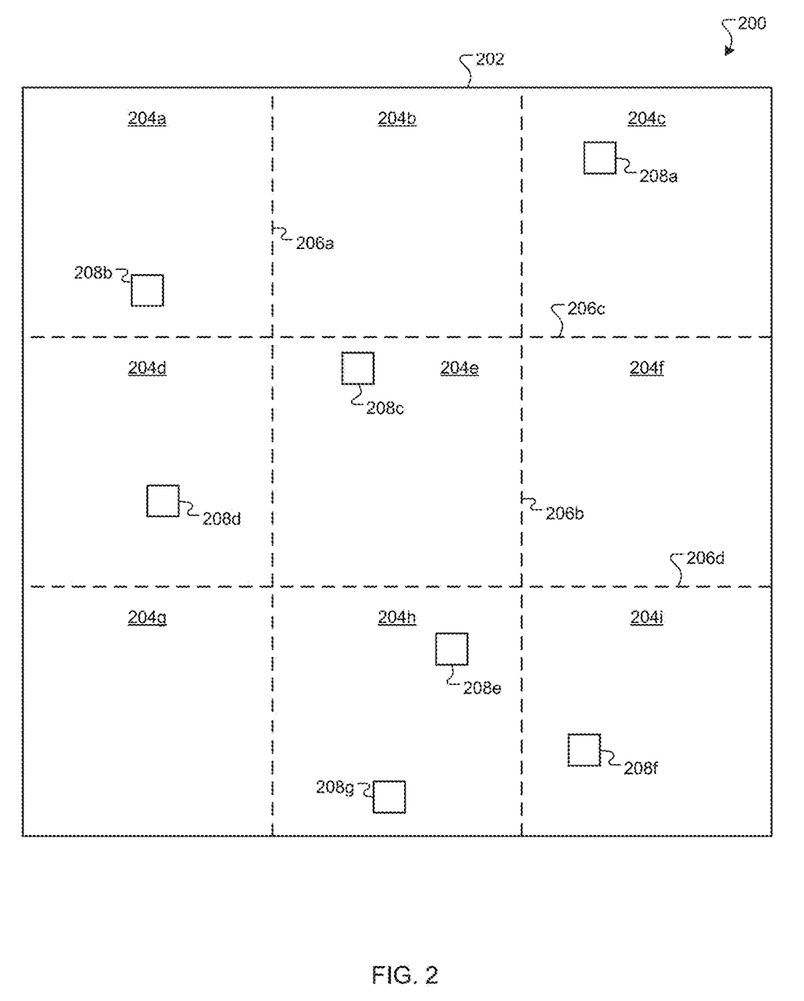
FIG. 2 is a schematic map of a virtual environment having a plurality of events of interest in an online game.

FIG. 2 is a schematic map 200 of a virtual environment 202 for the online game. In the depicted example, the virtual environment 202 is divided into a plurality of regions 204a-204i by boundary lines 206a-206d, although the virtual environment 202 can be divided into any suitable number of regions by any appropriate number of boundary lines. Each player (or the player's character or avatar) can belong to or reside in one of the regions 204a-204i and can be affiliated with other players who belong to or reside in the same region. In the context of an adventure game, each region can be or correspond to, for example, a city, state, country, kingdom, island, or other portion of the virtual environment 202.

At any given time in the online game, the virtual environment 202 can include a plurality of events, such as, for example, events 208a-208g, that users may be interested in witnessing. To identify the events 208a-208g, the server system 112 can monitor or perform a scan of a current state of the virtual environment 202. For example, the event module 118 can scan the game state (e.g., as determined by the game module 116) to search for events (e.g., events 208a-208g) and collect parameters associated with the events. The events can be or include, for example, a competition involving one or more players, an attack by one or more players against one or more other players, a battle between two or more players or between two or more kingdoms of players, a use or movement of virtual assets (e.g., weapons, troops, cards, and/or virtual currency), and/or a unique or difficult problem solved by a user. Other types of user and game events are possible and can depend on the online game. For example, events can be or include contests or challenges that couple one or more player activities with one or more player dispositions and/or rewards during a specified range of time. A point system can be used in which players can earn points for accomplishing one or more tasks associated with an event. The parameters for the events 208a-208g can be or include, for example, a user level (e.g., advanced or beginner) in the online game, a user condition (e.g., a collection of cards, weapons, defenses, or other assets) in the online game, a user connection status (e.g., connected or disconnected) with the online game, a user history (e.g., with another user, such as a new relationship or an ongoing feud) in the online game, a quantity of points or other player assets involved in an event (e.g., an amount a player could gain or lose), and/or a location in a virtual environment for the online game. Other types of parameters are possible. The event module 118 can perform scans of the game state continuously and/or periodically (e.g., every minute, every 30 minutes, or every hour).

In certain examples, the event parameters collected by the event module 118 are provided to a predictive model that can form a part of or be executed by the event module 118 and can predict how interested users may be in witnessing each event. The predictive model can receive the event parameters as input and provide as output a score indicating the predicted level of interest. The predictive model can be or include, for example, a regression equation developed by fitting a functional form through data. An example predictive model for calculating a score S can be given by $$S = w_0 + w_1 * P_1 + w_2 * P_2 + \ldots + w_n * P_n, \quad (1)$$

where $w_0, w_1, w_2, \ldots, w_n$ are weights or constants (e.g., determined by fitting the equation (1) to data) and $P_1, P_2, \ldots, P_n$ are event parameters. Example event parameters and values for the parameters are provided in Table 1.

TABLE 1

Example event parameters and possible values.

| Event Parameter | Possible Values |
| --- | --- |
| User Level | 1 to Max. Level (e.g., 10, 20, or higher) |
| User Defense Parameter | 0 to 1 (e.g., 0 when defenses are minimized and 1 when defenses are maximized) |
| User Connection Status | 1 = connected<br>0 = disconnected |
| History Parameter | Number of disputes between users within a previous time period (e.g., 0 to 10) |
| Location Parameter | 0 to 1 (e.g., 0 when event is in region with low population density and 1 when event is in region with high population density) |

Additionally or alternatively, the predictive model can be or include a classifier such as, for example, one or more linear classifiers (e.g., Fisher's linear discriminant, logistic regression, Naive Bayes classifier, and/or perceptron), support vector machines (e.g., least squares support vector machines), quadratic classifiers, kernel estimation models (e.g., k-nearest neighbor), boosting (meta-algorithm) models, decision trees (e.g., random forests), neural networks, and/or learning vector quantization models. Other classifiers can be used. The classifier is preferably trained using training data that includes event parameters collected by the event module 118 and corresponding interest levels (e.g., determined by game developers and/or users), for a wide range of event types. In some examples, experiments performed with various algorithms that indicate logistic regression classifiers can provide a best or most accurate outcome. Once trained, the one or more classifiers can receive event parameters as input and provide scores for events as output.

In various implementations, the event module 118 and the predictive model can search for and identify a wide range of events that may be of interest to users. For example, the event module 118 can search for and identify (using the predictive model) events in which a high-power player is about to engage or attack another player of sufficient power. When calculating the interest level score, the predictive model can consider whether a player being engaged is online or not. For example, users may enjoy watching a lopsided battle in which one of the players is offline. Other users may prefer to watch a more balanced battle in which both players are online and able to participate. Additionally or alternatively, the predictive model can consider other event parameters, such as a state of player defenses, whether players participating in a competition or battle have been involved in an ongoing feud, and/or whether events are occurring in areas of a virtual environment where other players are looking or currently located. In general, events occurring in high activity areas of a virtual environment are more likely to be of interest to users. Other suitable search strategies and event parameters (alone or in combination) are possible and can depend on the type of game in which the systems and methods are implemented. The event parameters and the predictive model are preferably tailored according to the type of game, given that the types of events that are interesting can vary from game to game.

In some examples, the event module 118 can consider or ignore events according to a type of action taken by users for the events and/or whether or not the action satisfies a threshold criterion for user interest. For example, when an event involves user action that satisfies the threshold criterion (e.g., an attack, a battle, a movement of assets, a unique or difficult problem in a strategy game, etc.), the event module 118 can consider the event and/or determine a score for the event. On the other hand, when an event involves user action that does not satisfy the threshold criterion (e.g., opening a treasure chest, acquiring a virtual item, constructing a building or defenses, etc.), the event module 118 can ignore the event and/or not determine a score for the event. In general, user actions can be categorized as either satisfying or not satisfying the threshold criterion, and the event module 118 can be configured to investigate events when the threshold criterion is satisfied (e.g., when one user attacks another user) and ignore events when the threshold criterion is not satisfied (e.g., when a user finds a virtual gold coin). Use of the threshold criterion can result in a more efficient use of system resources, given that certain events can be ignored by the event module 118.

Still referring to FIG. 2, in various implementations, the server system 112 can deploy the event module 118 on multiple server computers. Each region 204a-204i in the virtual environment 202, for example, can be assigned to a different server computer that can determine events of interest for the respective region. Events of interest can be aggregated for the entire virtual environment 202 and/or can be organized by region 204a-204i. For example, a user can be presented with events of interest for the entire virtual environment 202 or for only one or more of the regions 204a-204i where the user is located or resides.

In various examples, the event module 118 can rank or order events of interest according to the scores calculated by the predictive model. The event module 118 can identify one or more events having the highest scores and can inform users about such events. For example, a listing of events having the highest scores can be generated by the event module 118 and provided to users through push notifications, game menus, social media, or similar communications. The users are able to select one of the events and become a spectator or witness for the selected event.

In general, when a user witnesses an event, the user can see and/or hear the event (e.g., a video of recorded game play or a display of live game play can be presented on the user's client device), but the user is preferably unable to participate in or influence the event. In preferred examples, users are able to witness events live, as the events are occurring in the online game. In some instances, however, users can view recordings of events that occurred previously. For example, it can be desirable to delay the presentation of events to certain spectators (e.g., users who are participating in the events); otherwise, some users could use the presentation to gain an unfair advantage in the online game (e.g., by being informed of an event and taking immediate action to influence the event).

Figure 3:
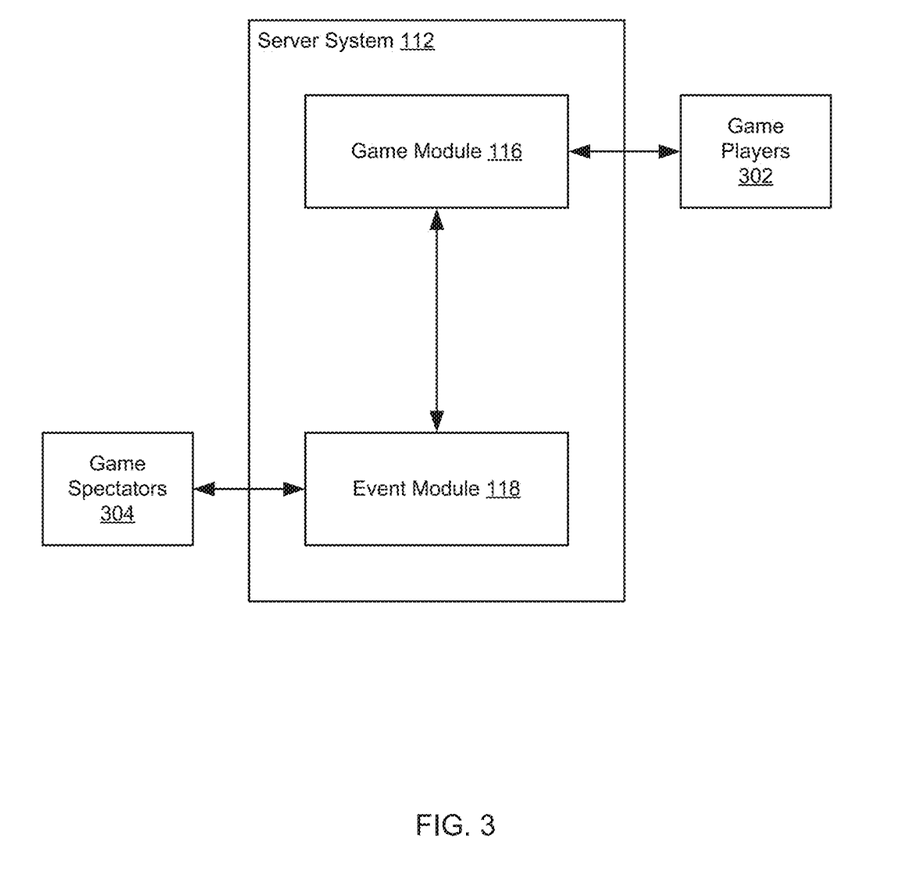
FIG. 3 is a schematic diagram of an example system for identifying events of interest in an online game and enabling users to witness the events of interest.

Referring to FIG. 3, in certain examples, the game module 116 and the event module 118 on the server system 112 are configured to communicate with users who are playing the online game and/or witnessing events in the online game. The game module 116 can manage the online game for a group of players 302 and communicate the game state to the event module 118. The event module 118 can scan or monitor the game state and determine events that users may be interested in witnessing. The event module 118 can enable a group of spectators 304 to witness the events of interest.

In certain examples, the group of spectators 304 can provide feedback on events that are witnessed, and the feedback can be used to improve the predictive model. For example, users who witness events can be given an opportunity to provide feedback on the events. The feedback can indicate, for example, how interesting or entertaining the events were for the users. In some instances, users can provide numerical ratings (e.g., on a scale from 1 to 10) for the witnessed events and/or can provide other indications indicating that the users liked or did not like the events. Additionally or alternatively, the event module 118 can gauge user interest in the events suggested by the predictive model based on, for example, how much time users spent witnessing events (e.g., 1 second vs. 1 minute), whether or not users chose to witness events, how many players witnessed events, and other similar criteria. Such feedback can be used to generate actual user interest scores, which can be compared with the scores determined by the predictive model, for example, to determine model accuracy. Additionally or alternatively, the feedback can be used to generate additional training data for the predictive model. For example, a regression equation and/or classifier used for the predictive model can be updated or adjusted according to the additional training data. In this way, the feedback can be used to improve the model, over time, and this can result in more accurate model predictions for future events.

In preferred implementations, the event parameters and/or the predictive model can be tailored according to user preferences so that model predictions are customized for each user's personal tastes, interests, game situation, or the like. Such tailoring can be achieved by, for example, adjusting coefficients or weights (e.g., weights $w_0, w_1, w_2, \ldots, w_n$) for a regression equation and/or using customized training data for one or more classifiers. Additionally or alternatively, different types of event parameters can be used as inputs to the predictive model, according to user preferences.

In some instances, users can be given control over how the predictive model is tailored. For example, a user can manually provide input regarding preferences or other criteria indicative of the user's interests. Some users, for example, might prefer to watch "heavyweight" battles between powerful players, while other users might prefer larger coordinated group assaults. Other such preferences or criteria can be specified the users.

Alternatively, rather than providing users with control over the tailoring, the server system 112 itself (e.g., the event module 118) can auto-select user preferences and interests based on, for example, a user's current game situation, playing habits, viewing patterns, and other similar criteria. In the context of an adventure game, for example, the event module 118 can discern that a player enjoys using many weapon components in the online game and, as a result, can tailor the predictive model to present the user with events in which the use of weapon components is instrumental. Additionally or alternatively, users who participate in certain types of events (e.g., cross-kingdom battles) can benefit from the event module 118 weighing such events more heavily. In some instances, the event module 118 can determine where a user spends time in the virtual environment (e.g., based on flags, "likes," and/or "bookmarks" the user places in the virtual environment) and can weigh events that occur in such locations more heavily.

In certain implementations, users can identify locations in the virtual environment as being points of interest, for example, by selecting a location on a map or other view of the virtual environment. When a user selects such a location, the user can be presented with several options for taking action related to the location. For example, the user can "like," "unlike," or "dislike" another user associated with the location, to indicate whether the other user is a user of interest. Once this is done, the other user and/or the location can be presented in a different color or given some other visual designation. The user can also "like" the location itself, to indicate that the location is a spot of interest (e.g., a contested area or an area with a resource) in the virtual environment. In some instances, the user can add a bookmark to the location, which can make it easier for the user to find the location again later. Additionally or alternatively, when a user selects a location, the user can be presented with a "tip jar" or other mechanism for sending another user at that location a virtual gift (e.g., a virtual item, a spell, or a temporary power boost) or virtual currency as a salute or thank you. This kind of feedback can encourage users to play the online game in a way that attracts and/or pleases an audience, which can have a positive influence on user engagement with the online game. In some implementations, the user can be presented with an option of placing a resource, treasure, a signpost, or other item of interest at a selected location, for example, to attract action from other users. Additionally or alternatively, the user can send a comment to another player at the selected location. The comment can be intended to taunt the other user and/or to improve a relationship with the other user. Users can alternatively share locations with other users (e.g., teammates). Any of these actions taken upon selecting a location can be or can be used as parameters for the predictive model to determine events of interest in the online game.

The user event module 118 is preferably configured to provide users with feedback regarding how interested other users are in the users' activities. For example, users can be notified when the users participated in events that were promoted or identified as hotspots to other users. To encourage users to participate in such events, in-game virtual gifts, virtual currency, or other resources can be provided to users who participate in hotspot events. Additionally or alternatively, users can be notified of spectator activity during or even before an event in a suitable manner (e.g., with on-screen notifications). In some instances, for example, a user can receive an in-game message indicating that the user was featured in a hotspot, such as "one of the big battles of the day."

In preferred implementations, the user event module 118 can determine a watchability score that provides a user with an indication of how interested other users are in witnessing the user's events or activities. The watchability score for the user can be determined based on a number of factors, including, for example, how many other users have witnessed the user's activity (e.g., during a pre-determined time period), how many events the user participated in that were witnessed by other users (e.g., during a pre-determined time period), and/or a score indicating an interest level for the user's events (e.g., during pre-determined time period). The user event module 118 can provide the user with the watchability score and/or rank. For example, the user can receive a messaging indicating that the user is among the most watched players (e.g., in the top 5%). In general, as other users become more or less interested in watching the user, the user's watchability score can change over time, and the user can be kept apprised of the current watchability score and/or any changes to the score. Advantageously, this approach of informing a user about the watchability score can heighten the user's experience in the online game. For example, a significant draw for some users of the online game can be respect and/or recognition from other users.

In certain implementations, the event module 118 can modify regions of the virtual environment according to user interest in the regions. For example, the event module 118 can place new resources and/or virtual items near a hotspot, in an effort to draw further attention to that location. Additionally or alternatively, the event module 118 can initiate a new activity or new event near a hotspot, such as a "capture the flag" game or some other activity or competition for users in that region. Conversely, such activities or events can be introduced in other regions, where interest is currently low, to increase user interest in those regions.

In some examples, a graphical display of the virtual environment can be modified according to user interest. For example, a hotspot can include a glow, a fire, a volcanic eruption, smoke, or some other suitable visual designation or enhancement. Additionally or alternatively, some suitable indication (e.g., a spectator participation meter) can be provided in or around the hotspot to represent, for example, a user interest score, a number of users who have viewed the hotspot, and/or a number of users who are currently viewing the hotspot. In general, such modifications can allow users to ascertain user interest levels based on quick visual inspections of the virtual environment.

Figure 4:
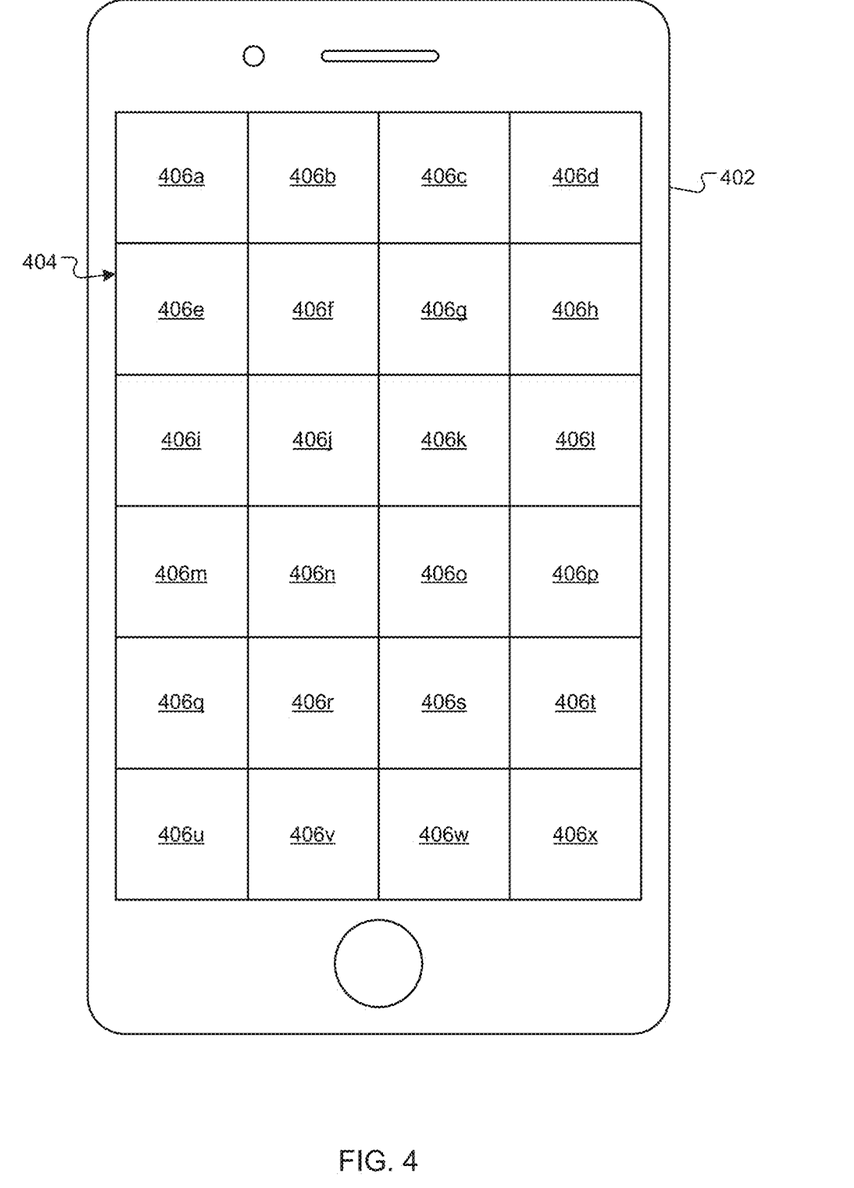
FIG. 4 is a schematic diagram of a client device displaying a grid of events of interest for an online game.

In general, various display arrangements, such as tables, lists, charts, links, etc., can be used to inform users about the existence of hotspots in the online game. Referring to FIG. 4, for example, a collection of hotspots can be presented on a client device 402 in the form of a grid 404 of elements 406a-406x, in which each element includes an image, video, and/or other description or representation of one of the hotspots. In the depicted example, the grid 404 includes 24 elements 402a-402x for 24 total hotspots, though the grid 404 can include other numbers of hotspots (e.g., 4, 6, 12, etc.). The hotspots can be arranged in the grid 404 according to ranking (e.g., based on the calculated scores). For example, more interesting hotspots can be positioned at the top of or in a middle portion of the grid 404, and less interesting hotspots can be positioned at the bottom of or near an outer portion of the grid 404. Additionally or alternatively, each of the hotspots displayed in the grid 404 can be color coded to indicate interest level. For example, more interesting hotspots can be given a reddish color while less interesting hotspots can be given a blueish color. In preferred examples, each element can include a brief label or description, such as "high-level battle" or "powerful player in big trouble," to allow users to determine a subject matter or context for each hotspot.

In general, the grid 404 can provide a convenient way for users to quickly scan a collection of hotspots in the online game. When a user selects one of the elements 402a-402x, the systems and methods can enable the user to witness a corresponding hotspot. For example, each element in the grid 404 can include or provide a link or portal that causes the selected hotspot to be presented on the client device 402.

In preferred examples, the hotspots can be automatically posted to the grid 404 or other display interface (e.g., table or listing) for user selection. Hotspots can preferably be shared by users, for example, by sending links through messaging services or through social media. In some examples, users can witness events using a software application that is different from a software application used to play the online game. Additionally or alternatively, the software application used to witness events can be the same as the software application used to play the online game.

Figure 5:
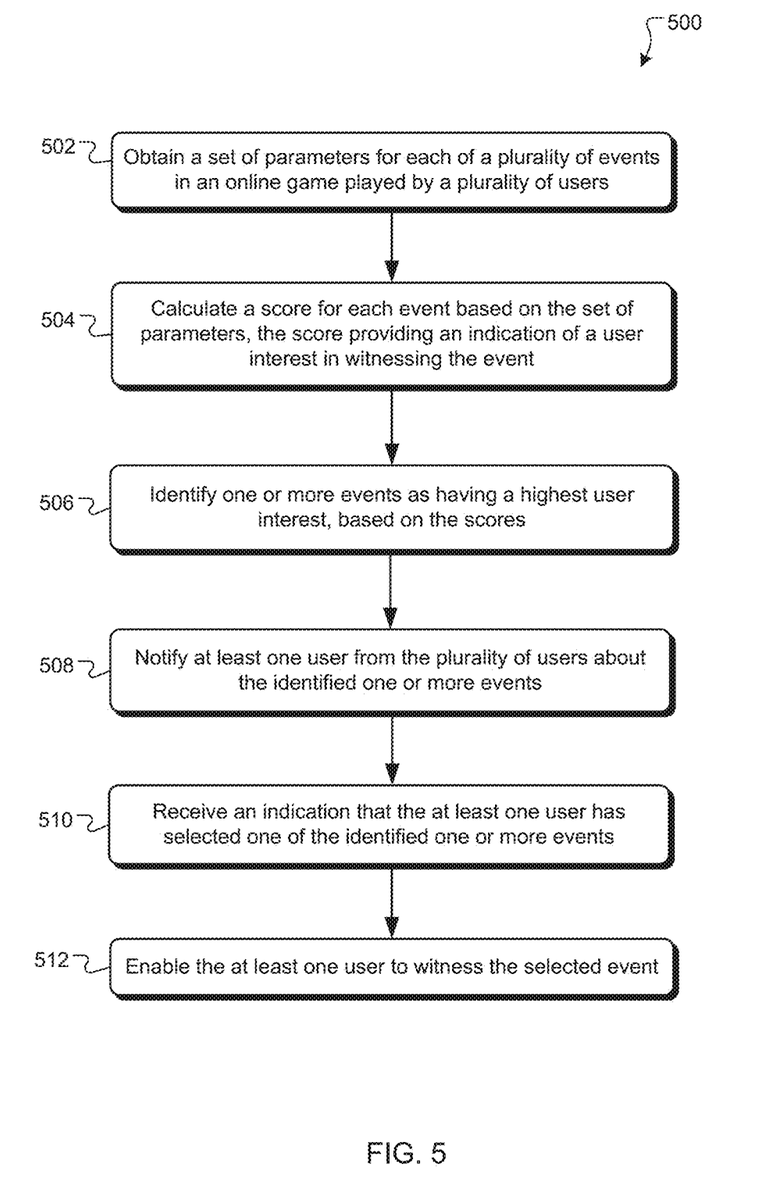
FIG. 5 is a flowchart of an example method of identifying events of interest in an online game and enabling users to witness the events of interest.

FIG. 5 illustrates an example computer-implemented method 500 of determining events of interest in an online game and enabling users to witness (e.g., be spectators of) the events of interest. A set of parameters is obtained (step 502) for each of a plurality of events in an online game played by a plurality of users. A score is calculated (step 504) for each event based on the set of parameters, wherein the score provides an indication of a user interest in witnessing the event. One or more events are identified (step 506) as having a highest user interest, based on the scores. At least one user from the plurality of users is notified (step 508) about the identified one or more events. An indication is received (step 510) that the at least one user has selected one of the identified one or more events. The at least one user is enabled (step 512) to witness the selected event.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
    obtaining a set of parameters for each of a plurality of events occurring in an online game played by a plurality of users;
    calculating, by one or more computer processors, a score for each event based on the set of parameters, the score providing an indication of a user interest in witnessing the event,
        wherein calculating the score for each event comprises using a predictive model that receives the set of parameters as input and provides the score as output, and wherein the predictive model comprises at least one of a regression equation or a trained classifier;
    identifying, by the one or more computer processors, a collection of events as having a highest user interest, based on the scores;
    notifying, by the one or more computer processors, at least one user from the plurality of users about the identified events,
        wherein notifying the at least one user comprises providing a display arrangement comprising a list or a grid in which the identified events are arranged according to the scores;
    receiving an indication that the at least one user has selected one of the identified events in the display arrangement; and
    enabling, by the one or more computer processors, the at least one user to witness the selected event,
        wherein enabling the at least one user to witness the selected event comprises presenting on a client device a live version of the selected event as the selected event is occurring in the online game.

2. The method of claim 1, wherein the parameters comprise at least one of a user level in the online game, a user condition in the online game, a user connection status to the online game, a user history with another user in the online game, and a location in a virtual environment for the online game.

3. The method of claim 1, wherein the plurality of events comprises at least one of a competition, an attack, a battle, a use of virtual assets, and a movement of virtual assets.

4. The method of claim 1, wherein obtaining the set of parameters comprises:
performing a periodic scan of a virtual environment for the online game.

5. The method of claim 1, further comprising:
determining an actual level of user interest in one or more events witnessed by one or more users.

6. The method of claim 1, further comprising:
identifying one or more users from the plurality of users who participated in the selected event; and
notifying the identified one or more users about a level of user interest in witnessing the selected event.

7. The method of claim 1, wherein enabling the at least one user to witness the selected event comprises:
preventing the user from participating in the selected event.

8. A system, comprising:
one or more computer processors programmed to perform operations comprising:
obtaining a set of parameters for each of a plurality of events occurring in an online game played by a plurality of users;
calculating a score for each event based on the set of parameters, the score providing an indication of a user interest in witnessing the event,
wherein calculating the score for each event comprises using a predictive model that receives the set of parameters as input and provides the score as output, and wherein the predictive model comprises at least one of a regression equation or a trained classifier;
identifying, by the one or more computer processors, a collection of events as having a highest user interest, based on the scores;
notifying, by the one or more computer processors, at least one user from the plurality of users about the identified events,
wherein notifying the at least one user comprises providing a display arrangement comprising a list or a grid in which the identified events are arranged according to the scores;
receiving an indication that the at least one user has selected one of the identified events in the display arrangement; and
enabling the at least one user to witness the selected event,
wherein enabling the at least one user to witness the selected event comprises presenting on a client device a live version of the selected event as the selected event is occurring in the online game.

9. The system of claim 8, wherein the parameters comprise at least one of a user level in the online game, a user condition in the online game, a user connection status to the online game, a user history with another user in the online game, and a location in a virtual environment for the online game.

10. The system of claim 8, wherein the plurality of events comprises at least one of a competition, an attack, a battle, a use of virtual assets, and a movement of virtual assets.

11. The system of claim 8, wherein obtaining the set of parameters comprises:
performing a periodic scan of a virtual environment for the online game.

12. The system of claim 8, the operations further comprising:
determining an actual level of user interest in one or more events witnessed by one or more users.

13. The system of claim 8, the operations further comprising:
identifying one or more users from the plurality of users who participated in the selected event; and
notifying the identified one or more users about a level of user interest in witnessing the selected event.

14. An article, comprising:
a non-transitory computer-readable medium having instructions stored thereon that, when executed by one or more computer processors, cause the computer processors to perform operations comprising:
obtaining a set of parameters for each of a plurality of events occurring in an online game played by a plurality of users;
calculating a score for each event based on the set of parameters, the score providing an indication of a user interest in witnessing the event,
wherein calculating the score for each event comprises using a predictive model that receives the set of parameters as input and provides the score as output, and wherein the predictive model comprises at least one of a regression equation or a trained classifier;
identifying, by the one or more computer processors, a collection of events as having a highest user interest, based on the scores;
notifying, by the one or more computer processors, at least one user from the plurality of users about the identified events,
wherein notifying the at least one user comprises providing a display arrangement comprising a list or a grid in which the identified events are arranged according to the scores;
receiving an indication that the at least one user has selected one of the identified events in the display arrangement; and
enabling the at least one user to witness the selected event,
wherein enabling the at least one user to witness the selected event comprises presenting on a client device a live version of the selected event as the selected event is occurring in the online game.

\* \* \* \* \*